(12) United States Patent
Cory

(10) Patent No.: US 9,743,805 B1
(45) Date of Patent: Aug. 29, 2017

(54) TOASTER ACCESSORY DEVICE AND METHOD

(71) Applicant: Rachel M. Cory, Palestine, TX (US)

(72) Inventor: Rachel M. Cory, Palestine, TX (US)

( * ) Notice: Subject to any disclaimer, the term of this patent is extended or adjusted under 35 U.S.C. 154(b) by 0 days.

(21) Appl. No.: 15/409,286

(22) Filed: Jan. 18, 2017

(51) Int. Cl.
*B32B 3/24* (2006.01)
*A47J 37/08* (2006.01)
*A23L 5/10* (2016.01)

(52) U.S. Cl.
CPC ............. *A47J 37/0885* (2013.01); *A23L 5/15* (2016.08); *A23V 2002/00* (2013.01)

(58) Field of Classification Search
CPC .. Y10T 428/24; A47J 37/0885; A47J 37/0871
USPC .......................................................... 428/80
See application file for complete search history.

(56) References Cited

U.S. PATENT DOCUMENTS

| | | | |
|---|---|---|---|
| 904,382 | A | 6/1908 | Patten |
| 1,961,643 | A | 6/1934 | Roth |
| 2,590,328 | A | 3/1952 | Ludvik |
| 4,533,558 | A | 8/1985 | Ogle |
| 2006/0201338 | A1 | 9/2006 | Levinson |

FOREIGN PATENT DOCUMENTS

WO     WO 93/09037    *   5/1993  ............. B65D 81/34

* cited by examiner

*Primary Examiner* — Alexander Thomas
(74) *Attorney, Agent, or Firm* — Integrity Patent Group, PLC; Edwin Wold

(57) ABSTRACT

A toaster accessory including a heat resistant body, a recessed gripping area, and a corrugated wall integrated into the heat resistant body. The toaster accessory is useful for allowing a slice of bread to be toasted evenly on both the front surface and the back surface in a toaster having a plurality of toast slots.

17 Claims, 5 Drawing Sheets

TOASTER ACCESSORY DEVICE AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of toaster accessories and more specifically relates to toaster accessory for a toaster having a plurality of toast slots.

2. Description of Related Art

A toaster, or a toast maker, is a small electric appliance designed to toast sliced bread by exposing it to radiant heat, thus converting it into toast. Toasters can toast multiple types of sliced bread products. A common toast maker found in many homes is the pop-up toaster. Bread slices are inserted into slots in the top of a pop-up toaster. Pop-up toasters with wider slots have been manufactured to toast sliced bread by exposing it to radiant heat, thus converting it into toast. Toasters can toast multiple types of sliced bread products simultaneously.

A common problem arising from toasters having a plurality of toast slots is when a user desires to toast a number of bread slices that is less than the number of slots the toaster has. If every slot is not occupied by a slice of bread, the radiant heat will be more exposed to the slice of bread nearest the unoccupied slot. Therefore, a suitable solution is desired.

U.S. Pat. No. 4,533,558 to Ogle relates to a toasting process using a toast guard. The described toasting process using a toast guard includes a toast guard made of a heat absorbent ceramic piece molded in the shape of a slice of bread, but slightly smaller in size and thickness than a slice of bread. The ceramic piece is used in the toasting process of an ordinary multi-slotted household toaster when some of the slots of the toaster are filled with slices of bread and some of the slots are vacant. The ceramic piece enables the toast to be darkened to the same degree on both sides and prevents the excessive darkening or burning of the side of the toast adjacent to a vacant slot in the toaster.

BRIEF SUMMARY OF THE INVENTION

In view of the foregoing disadvantages inherent in the known toaster accessory for a toaster having a plurality of toast slots art, the present disclosure provides a novel toaster accessory device and method. The general purpose of the present disclosure, which will be described subsequently in greater detail, is to provide a toaster accessory device and method.

A toaster accessory is disclosed herein. The toaster accessory includes a heat resistant body that is insertable into one of the plurality of toast slots on a toaster having a plurality of toast slots. The heat resistant body is resistant to heat produced by the toaster. The heat resistant body is arranged in a shape of a slice of bread having a front surface, a back surface, and a side perimeter. The side perimeter is circumscribing and extending between the front surface and the back surface. The side perimeter is also defined by a bottom side opposite a top side and a left side opposite a right side. The top side is substantially curved and the bottom side is substantially straight. Furthermore, the heat resistant body has a top portion, a middle portion, and a bottom portion. The top portion is extending from the top side to the middle portion, and the bottom portion is extending from the bottom side to the middle portion. A recessed gripping area is integrated into the heat resistant body within the top portion, and recessed into the front surface and the back surface. A corrugated wall is also integrated into the heat resistant body between and including the front surface and the back surface. The corrugated wall is positioned below the top portion, and is substantially extending between the right side and the left side.

According to another embodiment, a method of using the toaster accessory is also disclosed herein. The method of using the toaster accessory includes inserting a slice of bread in a toaster having a plurality of toast slots, inserting the toaster accessory in an unused toast slot adjacent the slice of bread, and activating the toaster having a plurality of toast slots. Furthermore, the method optionally includes removing the toaster accessory from the unused toast slot once the slice of bread has been toasted equally on both sides.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a toaster accessory device and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a toaster accessory for a toaster having a plurality of toast slots and more particularly to a toaster accessory device and method as used to improve the toaster accessory.

Generally, the toaster accessory may be utilized when a user desires to toast a number of sliced bread less than the number of toaster slots provided. The slice of bread adjacent to the unused toast slot in the toaster receives more radiant heat, thereby toasting one side of the slice of bread more than the other side. With the toaster accessory, the radiant heat may be deflected and vented out of the unused toast slot or otherwise discharged, allowing the slice of bread to be toasted more evenly on both sides. The radiant heat that is not deflected or vented may be absorbed by the toaster accessory, thereby preventing any excess radiant heat from contacting the slice of bread. Herein the "slice of bread" is understood to include a variety of products such as bagels, English muffins, Pop-Tarts®, pastries, etc. The toaster accessory may be advantageous in that it is composed of a heat resistant material while being lightweight, for example, no more than 145 grams.

Figure 1:
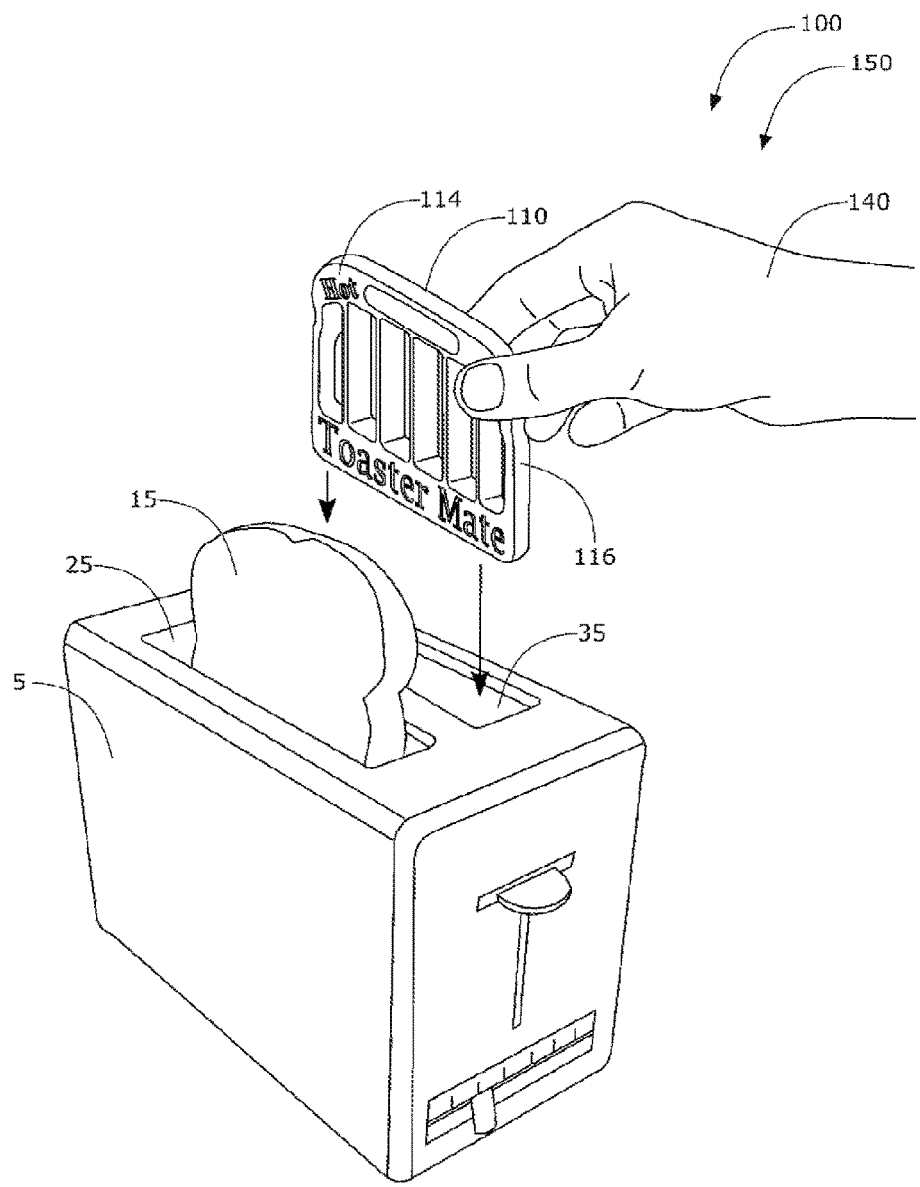
FIG. 1 is perspective view of the toaster accessory during an 'in-use' condition, according to an embodiment of the disclosure.

Referring now more specifically to the drawings by numerals of reference, there is shown in FIGS. 1-4, various views of a toaster accessory 100. FIG. 1 shows a toaster accessory 100 during an 'in-use' condition 150, according to an embodiment of the present disclosure. Here, the toaster accessory 100 may be beneficial for use by a user 140 by providing a toaster accessory 100 for a toaster 5 having a plurality of toast slots 25, each of the plurality of toast slots 25 having a volume configured to receive a slice of bread 15. The toaster accessory 100 may allow for the slice of bread 15 to be toasted evenly on both sides in the toaster 5. As illustrated, the toaster accessory 100 may include a heat resistant body 110 that may be insertable into one of the plurality of toast slots 25 on the toaster 5. The heat resistant body 110 may be resistant to heat produced by the toaster 5.

According to one embodiment, the toaster accessory 100 may be arranged as a kit 105. In particular, the toaster accessory 100 may further include a set of instructions (not shown). The instructions may detail functional relationships in relation to the structure of the toaster accessory 100 (such that the toaster accessory 100 can be used, maintained, or the like, in a preferred manner).

According to one embodiment, the heat resistant body 110 may be ceramic. However, additional material may be considered based on further improvements made in manufacturing or user preferences. During manufacturing, ceramic clay may be poured into a mold composed from plastic or other desired molding material. In this process, features described of the toaster accessory 100 may be formed.

According to one embodiment, the heat resistant body 110 may be arranged in the shape of the slice of bread 15 having a front surface 112 (FIG. 4), a back surface 114, and a side perimeter 116. The shape of the slice of bread 15 referred to here may to be broadly similar to most pre-sliced bread commercially sold in grocery stores. The side perimeter 116 may be circumscribing and extending between the front surface 112 and the back surface 114. For example, the side perimeter 116 may be analogous to the crust of a slice of bread.

Figure 4:
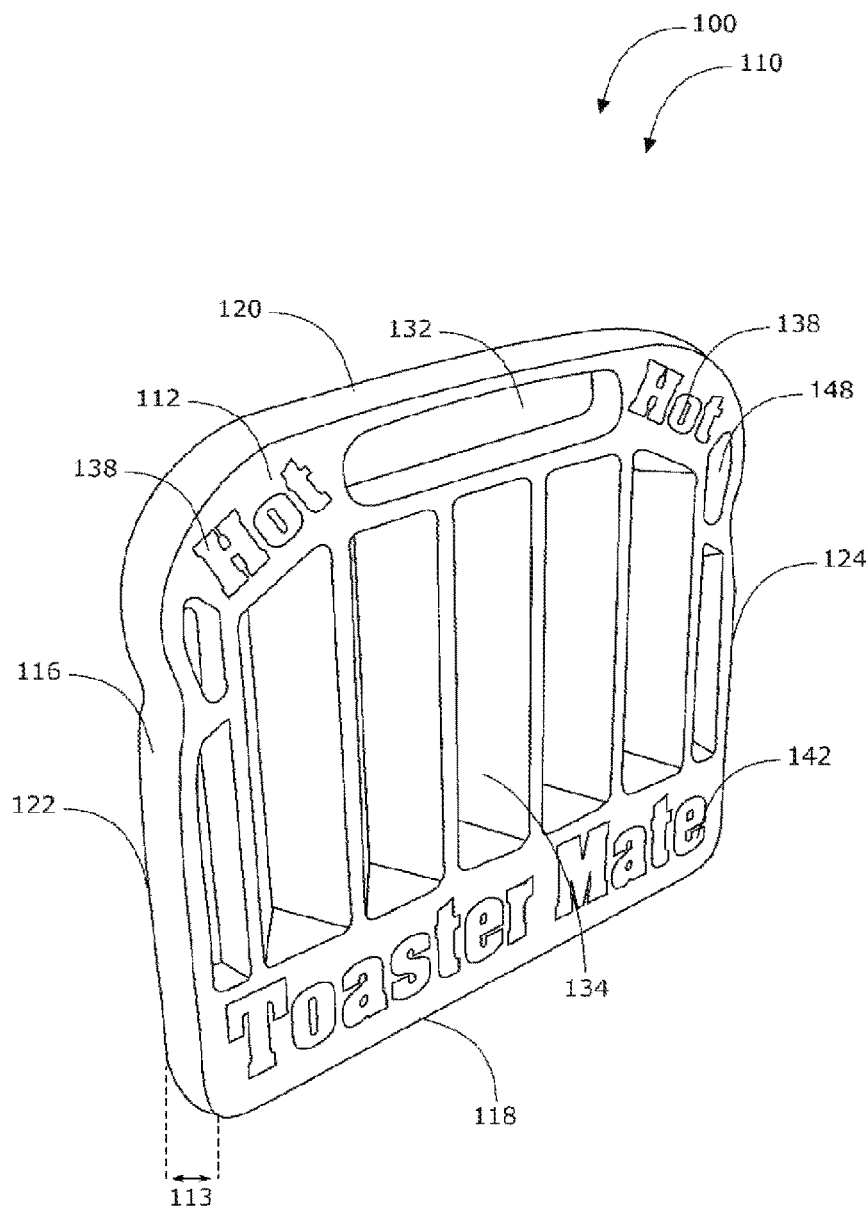
FIG. 4 is a front perspective view of the toaster accessory of FIG. 1, according to an embodiment of the present disclosure.

Referring to FIG. 4, the side perimeter 116 may also be broadly defined by a bottom side 118 opposite a top side 120 and a left side 122 opposite a right side 124. As viewed from a reference plane between the front surface 112 and the back surface 114 (FIG. 1), the top side 120 may be substantially curved (e.g., resembling the top curvature of a bread loaf) and the bottom side 118 may be substantially straight (e.g., resembling the flattened bottom of a bread loaf).

Figure 2:
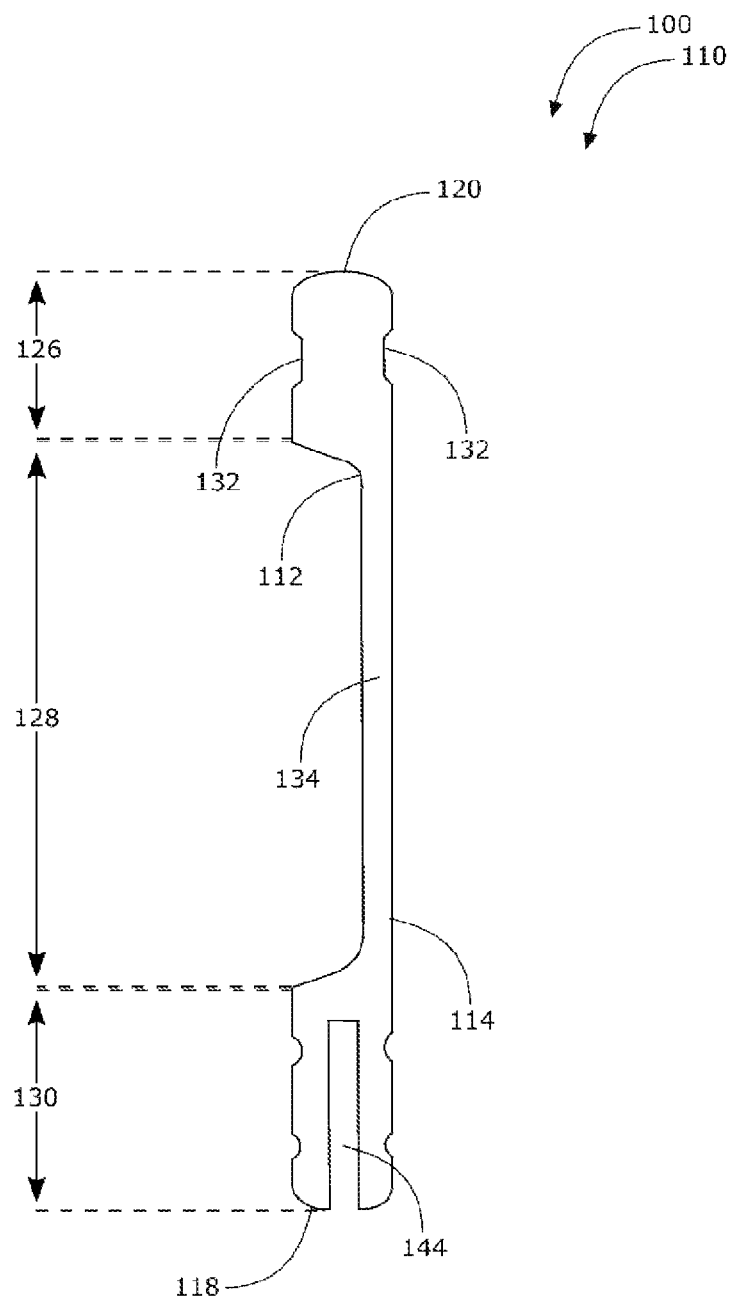
FIG. 2 is a cross-section view of the toaster accessory of FIG. 1 taken along Section line A-A of FIG. 4, according to an embodiment of the present disclosure.

FIG. 2 shows the toaster accessory 100 of FIG. 1, according to an embodiment of the present disclosure. As illustrated, the heat resistant body 110 may have a top portion 126, a middle portion 128, and a bottom portion 130. The top portion 126 may extend from the top side 120 to the middle portion 128. The bottom portion 130 may extend from the bottom side 118 to the middle portion 128. The middle portion 128 may extend from the bottom portion 130 to the top portion 126.

The toaster accessory 100 may further include a recessed gripping area 132, which may be integrated into the heat resistant body 110 within the top portion 126, and recessed into the front surface 112 and the back surface 114.

The toaster accessory 100 may further include a plurality of cavities 144 in the bottom portion 130. In particular, the plurality of cavities 144 may extend through the bottom side 118 in the bottom portion 130, between the front surface 112 and the back surface 114. The plurality of cavities 144 may be round and have a diameter between 0.11 and 0.14 inch. The plurality of cavities 144 may have an aggregated volume of at least 10% of a bottom volume, the bottom volume being measured between the front surface 112 and the back surface 114 in the bottom portion 130. The shape of the plurality of cavities 144 may be modified; however, it must reduce the aggregated volume of the bottom volume by at least 10%. In this embodiment, the weight of the toaster accessory 100 is not more than 145 grams and/or may not hinder the function of the bread lifting springs inside the toaster 5.

Figure 3:
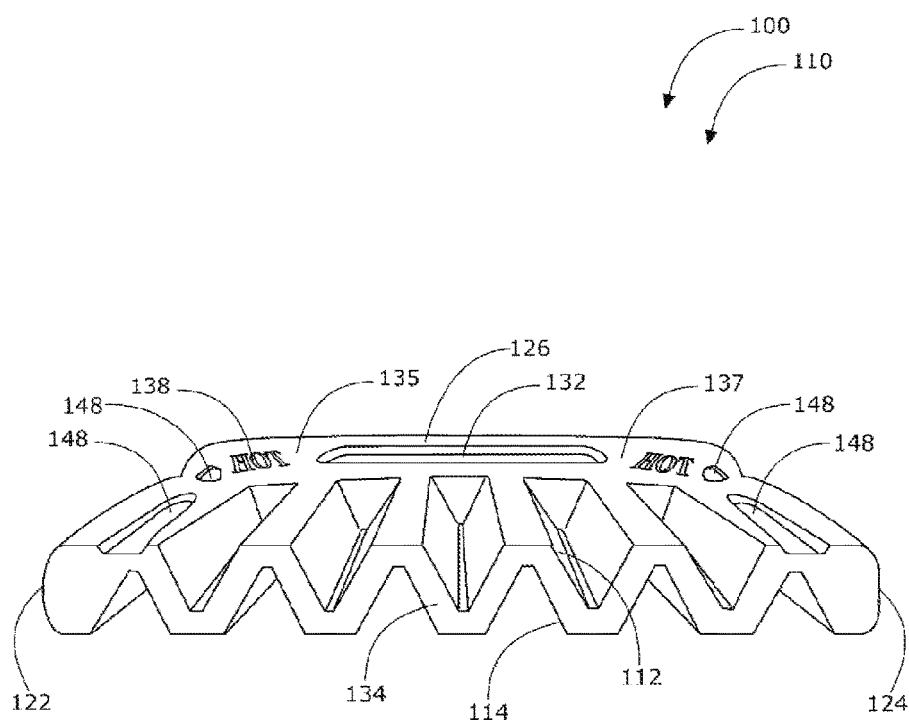
FIG. 3 is a bottom perspective view of a cut-away of the toaster accessory of FIG. 1 taken along Section line B-B of FIG. 4, according to an embodiment of the present disclosure.

FIG. 3 is a cut-away view of the toaster accessory 100 of FIG. 1, according to an embodiment of the present disclosure. As shown, the toaster accessory 100 may further include a corrugated wall 134, which may also integrated into the heat resistant body 110 between and including the front surface 112 and the back surface 114. The corrugated wall 134 may be positioned below the top portion 126, and may be substantially extending between the right side 124 and the left side 122. The corrugated wall 134 may provide weight-reduction to enable the toaster accessory 100 to be under 145 grams, and in addition, to absorb and vent the radiant heat out of the toaster 5. According to one embodiment, the recessed gripping area 132 and the corrugated wall 134 may be formed from the heat resistant body 110 as a continuous body.

As described above, the corrugated wall 134 may be integrated into the heat resistant body 110 between and including the front surface 112 and the back surface 114. The corrugated wall 134 may have a wall-thickness, the wall-thickness being measured between and perpendicular to the front surface 112 and the back surface 114. The wall-thickness may be less than 0.2 inch.

Furthermore, the heat resistant body 110 may include a pair of front side grooves 148 recessed into the heat resistant body 110 below the top portion 126 between the corrugated wall 134 and the right side 124 and the left side 122, respectively. The pair of front side grooves 148 may further reduce weight of the toaster accessory 100 and vent radiant heat out of the toaster 5. For example, as shown, the pair of front side grooves 148 may correspond to a continuation of a portion of the corrugated wall 134 respecting shape/curvature of the right side 124 and the left side 122 approximating a side crust of a slice of bread.

FIG. 4 is a front perspective view of the toaster accessory 100 of FIG. 1, according to an embodiment of the present disclosure. The side perimeter 116 described of the heat resistant body 110 may have a minimum thickness 113 of at least 0.5 inch, the minimum thickness 113 being measured between and perpendicular to the front surface 112 and the back surface 114.

As shown in FIG. 2, the back surface 114 and on the front surface 112 in the top portion 126, with the exception of the recessed gripping area 132, may be substantially flat and parallel to each other. Similarly, the bottom portion 130 may be substantially flat on the back surface 114 and on the front surface 112.

As shown in FIG. 3, the front surface 112 and the back surface 114 may include indicia 138 in the top portion 126. The indicia 138 may be positioned on a left side 135 and a right side 137 of the recessed gripping area 132 on the front surface 112 and on the back surface 114, respectively. The indicia 138 may include warning language (e.g., "Hot"). As the top portion 126 may be seen by the user 140 when utilizing the toaster accessory 100, the warning language may provide the user 140 with instructions that prevent misusing the toaster accessory 100.

As shown in FIG. 4, the bottom portion 130 may include additional indicia 142 positioned on the back surface 114 and on the front surface 112. The additional indicia 142 may extend substantially from the left side 122 to the right side 124 on the back surface 114, and similarly on the front surface 112. The additional indicia 142 may include branding or other marketing language. The indicia 138 and the additional indicia 142 may be engraved on the back surface 114 and the front surface 112.

Figure 5:
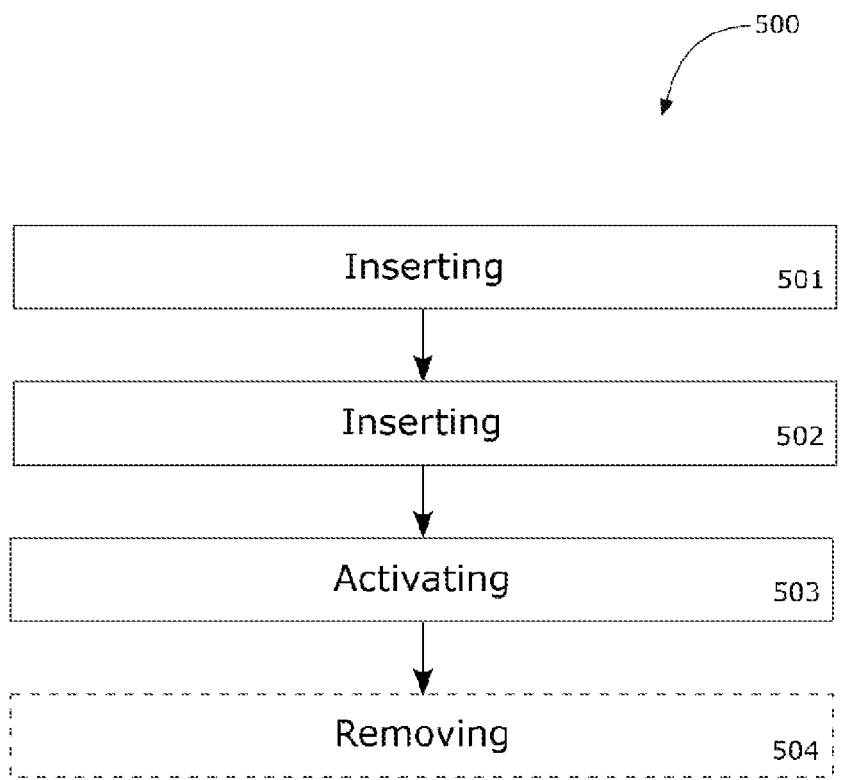
FIG. 5 is a flow diagram illustrating a method of using the toaster accessory according to an embodiment of the present disclosure.

FIG. 5 is a flow diagram illustrating a method of using the toaster accessory 500, according to an embodiment of the present disclosure. In particular, the method for using the toaster accessory 500 may include one or more components or features of the toaster accessory 100 as described above. As illustrated, the method of using the toaster accessory 500 may include the steps of: step one 501, inserting a slice of bread in a toaster having a plurality of toast slots; step two 502, inserting the toaster accessory in an unused toast slot adjacent the slice of bread; step three 503, activating the toaster having the plurality of toast slots; and step four 504, removing the toaster accessory from the unused toast slot once the slice of bread has been toasted equally on both sides.

It should be noted that step four is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. §112(f). It should also be noted that, under appropriate circumstances, considering such issues as design preference, user preferences, marketing preferences, cost, structural requirements, available materials, technological advances, etc., other methods of using the toaster accessory 100 (e.g., different step orders within above-mentioned list, elimination or addition of certain steps, including or excluding certain maintenance steps, etc.), are taught herein.

Upon reading this specification, it should be appreciated that, under appropriate circumstances, considering such issues as user preferences, design preference, structural requirements, marketing preferences, cost, available materials, technological advances, etc., other manufacturing arrangements such as, for example, molding processes, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desire to be protected by Letters Patent is set forth in the appended claims:

1. A toaster accessory for a toaster having a plurality of toast slots, each of the plurality of toast slots having a volume configured to receive a slice of bread, the toaster accessory comprising:
   a heat resistant body insertable into one of the plurality of toast slots and resistant to heat produced by the toaster, the heat resistant body arranged in a shape of a slice of bread having a front surface, a back surface, and a side perimeter, the side perimeter circumscribing and extending between the front surface and the back surface, the side perimeter defined by a bottom side opposite a top side, and a left side opposite a right side, the top side being substantially curved and the bottom side being substantially straight, the heat resistant body having a top portion, a middle portion, and a bottom portion, the top portion extending from the top side to the middle portion and the bottom portion extending from the bottom side to the middle portion, wherein the bottom portion includes a plurality of cavities extending through the bottom side between the front surface and the back surface;
   a recessed gripping area integrated into the heat resistant body within the top portion, and recessed into the front surface and the back surface; and
   a corrugated wall integrated into the heat resistant body between and including the front surface and the back surface, the corrugated wall positioned below the top portion and substantially extending between the right side and the left side.

2. The toaster accessory of claim 1, wherein the side perimeter has a minimum thickness of at least 0.5 inch, said minimum thickness being measured between and perpendicular to the front surface and the back surface.

3. The toaster accessory of claim 1, wherein the back surface and the front surface, in the top portion, with the exception of the recessed gripping area, are substantially flat and parallel to each other.

4. The toaster accessory of claim 3, wherein the front surface and the back surface includes indicia in the top portion, said indicia positioned on a left side and a right side of the recessed gripping area on the front surface and on the back surface, respectively.

5. The toaster accessory of claim 4, wherein the indicia includes warning language.

6. The toaster accessory of claim 1, wherein the bottom portion is substantially flat on the back surface and on the front surface.

7. The toaster accessory of claim 6, wherein the bottom portion includes additional indicia positioned on the back surface and on the front surface.

8. The toaster accessory of claim 7, wherein the additional indicia extends substantially from the left side to the right side on the back surface and on the front surface.

9. The toaster accessory of claim 1, wherein the plurality of cavities are round at the bottom side, and have a diameter between 0.11 and 0.14 inch.

10. The toaster accessory of claim 1, wherein the plurality of cavities have an aggregated volume of at least 10% of a bottom volume, said bottom volume measured between the front surface and the back surface in the bottom portion.

11. The toaster accessory of claim 1, wherein the corrugated wall has a wall-thickness, said wall-thickness being measured between and perpendicular to the front surface and the back surface.

12. The toaster accessory of claim 11, wherein wall-thickness is less than 0.2 inch.

13. The toaster accessory of claim 1, wherein the heat resistant body includes a pair of front side grooves recessed into the heat resistant body below the top portion between the corrugated wall and the right side and the left side, respectively.

14. The toaster accessory of claim 1, wherein the recessed gripping area and the corrugated wall are formed from the heat resistant body as a continuous body.

15. The toaster accessory of claim 14, wherein the heat resistant body is ceramic.

16. A toaster accessory for a toaster having a plurality of toast slots, each of the plurality of toast slots having a volume configured to receive a slice of bread, the toaster accessory comprising:
a heat resistant body insertable into one of the plurality of toast slots and resistant to heat produced by the toaster, the heat resistant body arranged in a shape of a slice of bread having a front surface, a back surface, and a side perimeter, the side perimeter circumscribing and extending between the front surface and the back surface, the side perimeter defined by a bottom side opposite a top side, and a left side opposite a right side, the top side being substantially curved and the bottom side being substantially straight, the heat resistant body having a top portion, a middle portion, and a bottom portion, the top portion extending from the top side to the middle portion and the bottom portion extending from the bottom side to the middle portion;
a recessed gripping area integrated into the heat resistant body within the top portion, and recessed into the front surface and the back surface;
a corrugated wall integrated into the heat resistant body between and including the front surface and the back surface, the corrugated wall positioned below the top portion and substantially extending between the right side and the left side; and
wherein the side perimeter has a minimum thickness of at least 0.5 inch, said minimum thickness being measured between and perpendicular to the front surface and the back surface;
wherein the back surface and the front surface, in the top portion, with the exception of the recessed gripping area, are substantially flat and parallel to each other;
wherein the front surface and the back surface includes indicia in the top portion, said indicia positioned on a left side and a right side of the recessed gripping area on the front surface and on the back surface, respectively;
wherein the indicia includes warning language;
wherein the bottom portion is substantially flat on the back surface and on the front surface;
wherein the bottom portion includes additional indicia positioned on the back surface and on the front surface;
wherein the additional indicia extends substantially from the left side to the right side on the back surface and on the front surface;
wherein the bottom portion includes a plurality of cavities extending through the bottom side between the front surface and the back surface;
wherein the plurality of cavities are round at the bottom side, and have a diameter between 0.11 and 0.14 inch;
wherein the plurality of cavities have an aggregated volume of at least 10% of a bottom volume, said bottom volume measured between the front surface and the back surface in the bottom portion;
wherein the corrugated wall has a wall-thickness, said wall-thickness being measured between and perpendicular to the front surface and the back surface;
wherein wall-thickness is less than 0.2 inch;
wherein the heat resistant body includes a pair of front side grooves recessed into the heat resistant body below the top portion between the corrugated wall and the right side and the left side, respectively;
wherein the recessed gripping area and the corrugated wall are formed from the heat resistant body as a continuous body; and
wherein the heat resistant body is ceramic.

17. The toaster accessory of claim 16, further comprising set of instructions; and
wherein the toaster accessory is arranged as a kit.

* * * * *